(12) United States Patent
Eiyama

(10) Patent No.: US 8,801,141 B2
(45) Date of Patent: Aug. 12, 2014

(54) RECORDING APPARATUS, DETECTION METHOD, AND STORAGE MEDIUM

(71) Applicant: Canon Kabushiki Kaisha, Tokyo (JP)

(72) Inventor: Masato Eiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/870,834

(22) Filed: Apr. 25, 2013

(65) Prior Publication Data

US 2013/0286306 A1 Oct. 31, 2013

(30) Foreign Application Priority Data

Apr. 27, 2012 (JP) .................................. 2012-102474

(51) Int. Cl.
*B41J 29/393* (2006.01)
(52) U.S. Cl.
USPC ...................... 347/19; 347/14; 347/5; 347/15
(58) Field of Classification Search
USPC ........................................... 347/19, 14, 5, 15
See application file for complete search history.

(56) References Cited

U.S. PATENT DOCUMENTS

2003/0011767 A1 1/2003 Imura et al.

FOREIGN PATENT DOCUMENTS

JP 2004-85376 A 3/2004

*Primary Examiner* — Henok Legesse
(74) *Attorney, Agent, or Firm* — Canon U.S.A., Inc. IP Division

(57) ABSTRACT

A recording apparatus includes a sensor including a light emitting element for emitting light to a recording medium, and a light receiving element for receiving the emitted light and reflected by the recording medium, configured to, via the light emitting and light receiving elements, measure a patch recorded on the recording medium by a recording head; a calibration member configured to reflect the emitted light and to be used to calibrate the sensor based on a result of optical measurement of the calibration member performed by receiving, via the light receiving element, reflected light reflected by the calibration member; and a detection unit configured to detect dirtiness of the calibration member based on the result of the optical measurement of the calibration member by the sensor and a result of optical measurement of the calibration member performed before the measurement.

20 Claims, 11 Drawing Sheets

FIG.3

| | 400 | 410 | 420 | 430 | 440 | 450 | ... | 660 | 670 | 680 | 690 | 700 |
|---|---|---|---|---|---|---|---|---|---|---|---|---|
| WHITE REFERENCE SPECTRAL REFLECTANCE | 85.5 | 88.5 | 90.8 | 91.9 | 92.3 | 92.4 | ... | 92.5 | 92.4 | 92.4 | 92.4 | 92.3 |
| REFERENCE VALUE FOR STATUS DETERMINATION | 87.8 | 92.3 | 95.0 | 94.8 | 94.1 | 94.5 | ... | 95.0 | 95.6 | 95.5 | 94.9 | 95.2 |

FIG.6

| INITIAL CORRECTION VALUE | dL* | da* | db* | DIFFERENCE STORAGE FLAG |
|---|---|---|---|---|
| DIFFERENCE MEMORY 0 | 0.15 | 0.20 | 0.04 | 1 |
| DIFFERENCE MEMORY 1 | 0 | 0 | 0 | 0 |

US 8,801,141 B2

RECORDING APPARATUS, DETECTION METHOD, AND STORAGE MEDIUM

BACKGROUND OF THE INVENTION

1. Field of the Invention

The present invention relates to a recording apparatus, a detection method, and a storage medium.

2. Description of the Related Art

An inkjet printing apparatus performs recording by discharging a plurality of ink drops from an inkjet head onto a recording medium. It is expected that each of the plurality of ink drops is discharged in a predetermined amount of discharge. Various errors included in the printing apparatus, for example, manufacturing errors of ink or an inkjet head may cause a difference of the volume of ink drops (actually discharged from the ink jet head) from the predetermined amount of discharge, possibly affecting the recording density. To cope with this problem, measures has been taken to record test patterns with the printing apparatus, detect the recording density by using a sensor including a light emitting element and a light receiving element, and correct image data to achieve a predetermined recording density. The optical characteristics of the light emitting element and the light receiving element vary for each sensor. Since a reading result of the sensor in optical characteristics correction affects the density of a print product, it is important to guarantee in advance the reading accuracy of the sensor. Therefore, U.S. Patent Application Publication No. 2003/0011767 discusses a spectrometric apparatus for performing sensor calibration by using a white calibration plate. Further, Japanese Patent Application Laid-Open No. 2004-85376 discusses a technique for detecting dirt on such a white calibration plate. The technique discussed in Japanese Patent Application Laid-Open No. 2004-85376 measures the optical density of the white base of a test chart and then distinguishes dirtiness of the white calibration plate based on the test result.

However, this technique has a problem of complicated operations involving test chart recording.

SUMMARY OF THE INVENTION

The present invention is directed to a recording apparatus for detecting the status of a calibration member used for sensor calibration in a simplified way.

According to an aspect of the present invention, a recording apparatus includes a sensor including a light emitting element for emitting light to a recording medium, and a light receiving element for receiving the light emitted from the light emitting element and reflected by the recording medium, configured to, via the light emitting element and the light receiving element, measure a patch recorded on the recording medium by a recording head for performing recording on the recording medium based on image data; a calibration member configured to reflect light emitted from the light emitting element, and to be used to calibrate the sensor based on a result of optical measurement of the calibration member performed by receiving, via the light receiving element, reflected light reflected by the calibration member; and a detection unit configured to detect dirtiness of the calibration member based on the result of the optical measurement of the calibration member by using the sensor and a result of optical measurement of the calibration member performed before the measurement.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating the reference spectral reflectance and the reference value for sensor status determination stored in a sensor of an inkjet recording apparatus according to an exemplary embodiment of the present invention.

FIG. 6 is a table illustrating the reference value for sensor status determination stored in a sensor in an inkjet recording apparatus according to a second exemplary embodiment of the present invention.

DESCRIPTION OF THE EMBODIMENTS

Various exemplary embodiments, features, and aspects of the invention will be described in detail below with reference to the drawings.

An inkjet recording apparatus will be described below as an example recording apparatus to which the present invention is applicable. However, such an apparatus is not limited to an inkjet recording apparatus. The present invention is also applicable to electrophotographic and thermal transfer recording apparatuses.

Figure 1A:
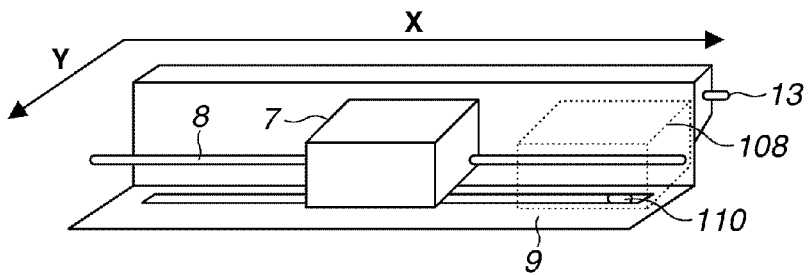
FIGS. 1A, 1B, and 1C schematically illustrate an inkjet recording apparatus and a colorimetric apparatus according to an exemplary embodiment the present invention.
Figure 1B:
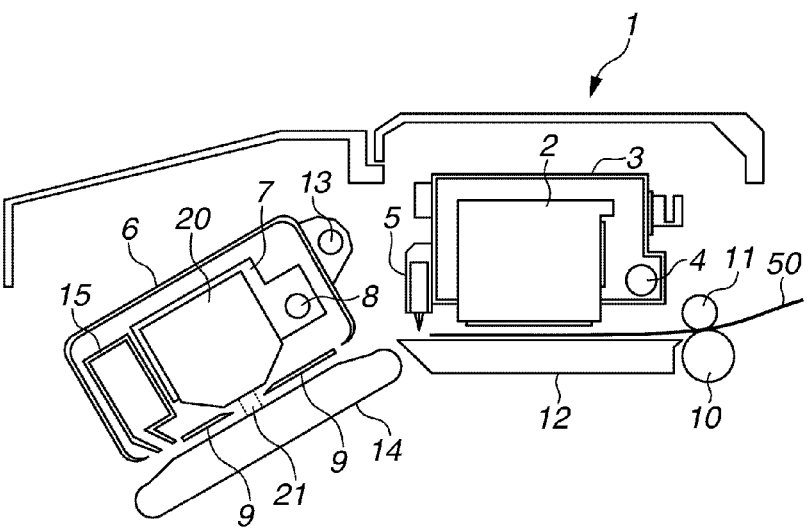
Figure 1C:
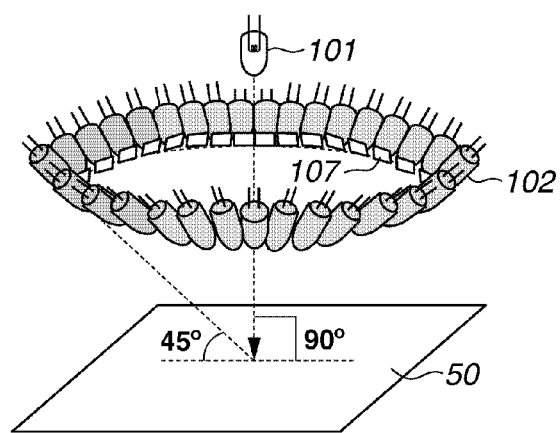
Figure 2:
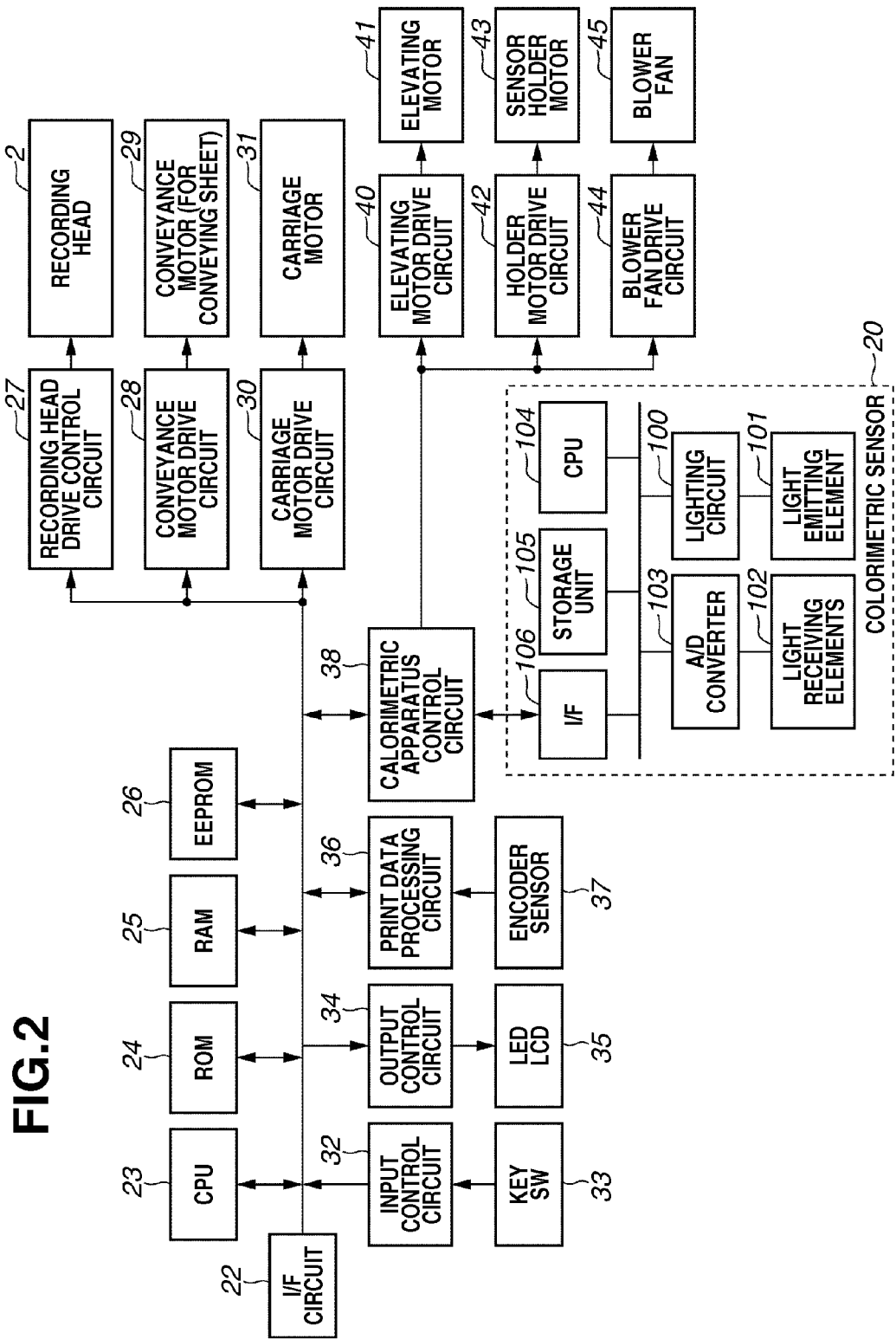
FIG. 2 is a block diagram illustrating a configuration of an inkjet recording apparatus according to an exemplary embodiment of the present invention.

FIGS. 1A, 1B, and 1C illustrate an inkjet recording apparatus including a colorimetric apparatus according to an exemplary embodiment of the present invention. FIG. 1A is a perspective view illustrating the inkjet recording apparatus. FIG. 1B is schematic cross sectional view illustrating the inkjet recording apparatus. FIG. 1C illustrates a colorimetric method. FIG. 2 is a schematic block diagram illustrating a control configuration for the inkjet recording apparatus.

As illustrated in FIG. 1B, an inkjet recording apparatus 16 stores a sheet 50 as a recording medium. When an end of the sheet 50 reaches a nip portion between a conveyance roller 10 and a pinch roller 11, the sheet 50 is nipped by the conveyance roller 10 and the pinch roller 11, and then conveyed onto a platen 12 disposed to face a recording head 2. When the sheet 50 is conveyed to an image recording unit, an image is recorded thereon by the recording head 2 for recording an image onto a recording medium based on image data. The image recording unit includes the recording head 2 for discharging ink from a discharge port, a carriage 3 for carrying the recording head 2, and the platen 12 disposed to face the recording head 2. The carriage 3 is slidably supported along with a carriage shaft 4 and a guide rail (not illustrated) disposed in parallel with each other in the inkjet recording apparatus 16.

The drive of the carriage 3 is controlled by a carriage motor 31 and a carriage motor control circuit 30 based on pulse information from an encoder sensor 37. Based on the pulse information from the encoder sensor 37, the printing timing of print data is synchronized with the position of the carriage 3 by a data processing circuit 36. Recording data is transmitted to a recording head drive control circuit 27, and then sequentially recorded by the recording head 2.

When printing is started, the carriage 3 records an image while moving forward or backward along the X direction illustrated in FIG. 1A. When an image for one line has been recorded, a conveyance motor 29 and a conveyance motor drive circuit 28 feed the sheet 50 by a predetermined pitch in the conveyance direction (Y direction), and then moves the carriage 3 again to record an image for the next line. A recorded portion on the sheet 50 is conveyed toward a discharge guide 14. This sequence is repeated to record an image on the entire page. Upon completion of image recording, a colorimetric region in a recorded portion of the sheet 50 is conveyed to a predetermined position by the conveyance roller 10 and the pinch roller 11. When colorimetry is not performed, the sheet 50 is cut by a cutter 5. The cut sheet 50 is discharged from the discharge guide 14 onto a discharge basket (not illustrated).

A colorimetric unit 6 is disposed above the discharge guide 14 on the downstream side of a printing unit. A colorimetric sensor 20 used for colorimetry can be mounted on a sensor holder 7 in the colorimetric unit 6.

The colorimetric sensor 20 is detachably attached to the colorimetric unit 6. A user attaches the colorimetric sensor 20 at the time of initial attachment, and detaches the colorimetric sensor 20 and a white reference plate 110 at the time of maintenance and periodical calibration.

A colorimetric unit 6 includes a blower fan 45 and a fan duct 15 for sending air to the sheet 50. The colorimetric apparatus control circuit 38 drives the blower fan 45 via a blower fan drive circuit 44 to send air to the sheet 50 at a predetermined position to promote the printed chart to be fixed.

The sensor holder 7 is supported by a colorimetric carriage shaft 8 and a guide rail (not illustrated) disposed in parallel with each other in the inkjet recording apparatus 16. The colorimetric chart on the sheet 50 is conveyed to under a colorimetric spot by the conveyance roller 10, the pinch roller 11, and a conveyance control unit. The colorimetric spot is located at a sensor spot 21, more specifically, at the center of a slit of a sheet presser member 9.

The colorimetric unit 6 rotates around a unit rotating shaft 13. When starting a colorimetric operation, the colorimetric unit 6 moves to a predetermined colorimetric position so that the sheet 50 is nipped between the sheet presser member 9 and the discharge guide 14. During non-colorimetric operations, the colorimetric unit 6 moves in the direction opposite to the direction moving during the colorimetric operation to avoid interference with the sheet 50.

When the colorimetric unit 6 reaches the predetermined colorimetric position, the sensor holder 7 moves to a reflectance correction position 108. The white reference plate 110 for reflectance correction is disposed at the reflectance correction position 108 so that the distance to the sheet 50 equals the distance between the reference position of the colorimetric sensor 20 and the sheet 50. Before colorimetry and in a case where a predetermined number of continuous colorimetric operations is exceeded, the colorimetric unit 6 performs reflectance correction.

Upon completion of reflectance correction, the colorimetric sensor 20 held by the sensor holder 7 moves along the colorimetric carriage shaft 8 and the guide rail, and then sequentially performs colorimetry for each patch in the colorimetric chart printed in parallel with the moving direction of the colorimetric sensor 20 on the sheet 50.

When performing colorimetry after completion of printing, a central processing unit (CPU) 23 drives the conveyance motor drive circuit 28 to convey, to a predetermined position, the chart subjected to colorimetry, which is printed on the sheet 50. A target position to which the chart is to be conveyed is calculated from mechanical design dimensions. When a fixing promotion function is selected, the CPU 23 conveys the chart to a position where air supplied from the fan duct 15 is applied. After blowing air for a fixed time period, the CPU 23 conveys the chart subjected to colorimetry so that the position of the optical axis center of the sensor pot 21 coincides with the position of the center of the chart in the conveyance direction. Although, in the present exemplary embodiment, the CPU 23 calculates the relevant position based on the design dimensions, correction values calculated for each sheet based on the slip amount related to the conveyance roller 10, the pinch roller 11, and the sheet 50 may be added to the design dimensions.

When the fixing promotion function is not selected, the CPU 23 omits the movement of the chart to the fixing position after completion of printing, and conveys the chart subjected to colorimetry so that the position of the optical axis center of the sensor pot 21 coincides with the position of the center of the chart in the conveyance direction.

Figure 11:
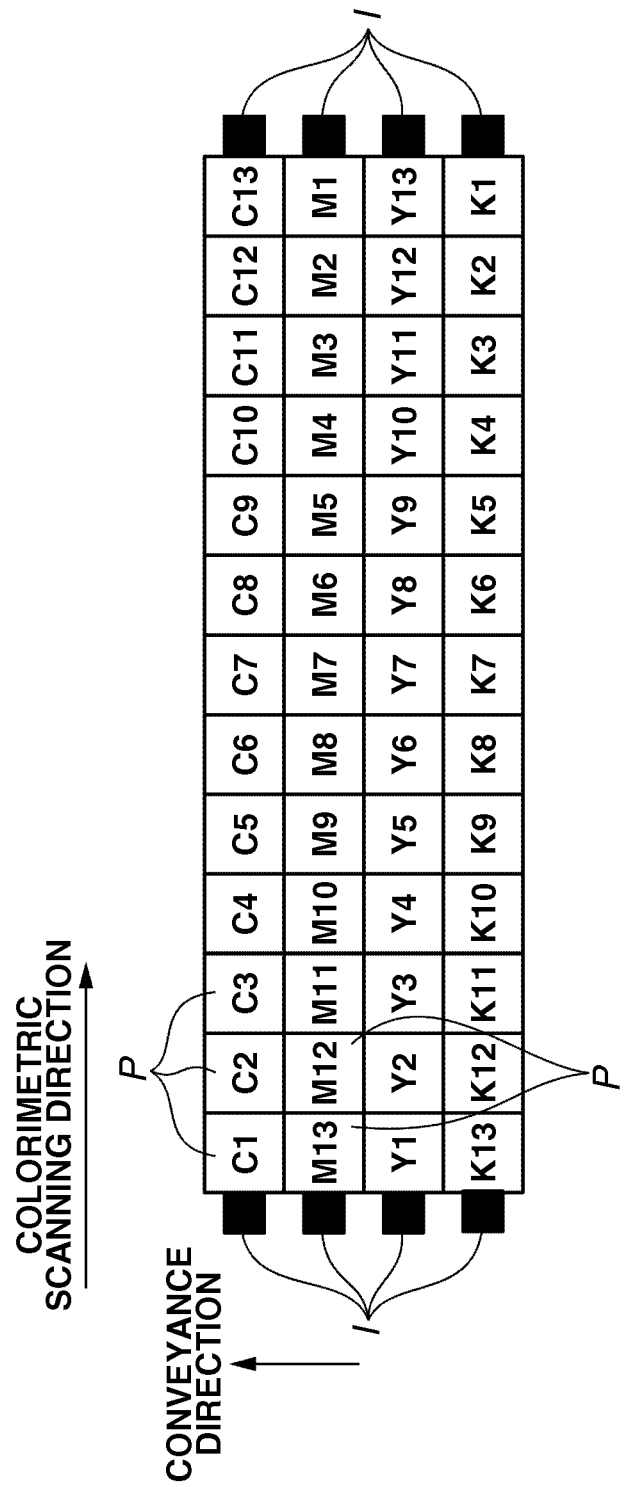
FIG. 11 schematically illustrates an example of a colorimetric chart used by the inkjet recording apparatus according to the first exemplary embodiment.

When the chart subjected to colorimetry reaches the predetermined position, the colorimetric unit 6 is moved so that the sheet presser member 9 contacts the discharge guide 14 to press the chart subjected to colorimetry. Then, the colorimetric unit 6 performs colorimetry by using the colorimetric sensor 20. FIG. 11 illustrates an example of a test chart. Patches P are arranged in the conveyance direction (the Y direction in FIG. 1) and in the colorimetric scanning direction (the X direction in FIG. 1). Cyan patches C1 to C13 are arranged so that the density increases with increasing patch number, i.e., the chart provides lower to higher gradation levels along the colorimetric scanning direction. Magenta patches M1 to M13 are arranged so that the chart provides higher to lower gradation levels along the colorimetric scanning direction. Yellow patches Y1 to Y13 and black patches K1 to K13 are respectively arranged so that the recording density increases with increasing patch number. In the colorimetric operation, the colorimetric sensor 20 irradiates the recorded patches with light having a predetermined light intensity and, based on the light-receiving intensity of reflected light, corrects the image data, for example, by changing pixel values of the image data.

Position determination patches I for recognizing the position in the colorimetric scanning direction are provided at both ends of the colorimetric scanning direction. During the scanning operation, the colorimetric sensor 20 detects a difference between the reflectances of a white portion and the position determination patches I to determine the starting and ending positions of the chart.

Further, the position determination patches I have a shorter length in the conveyance direction than other patches in the chart. When the conveyance direction largely differs from the spot position of the colorimetric sensor 20, the difference between the reflectances of the white portion and the position determination patches I becomes smaller, making it difficult to accurately determine the starting and ending positions of the chart. As a result, the recording apparatus 16 determines an error. Thus, the patches are arranged so as to prevent incorrect colorimetry due to effects of adjacent patches if the chart is shifted in the conveyance direction.

When the chart subjected to colorimetry is composed of a plurality of lines, the colorimetric unit 6 sequentially performs colorimetry by repeating the above-described operation for each line. Upon completion of colorimetry for all of the lines, the colorimetric region of the recorded portion on the sheet 50 is conveyed to the predetermined position by the conveyance roller 10 and the pinch roller 11. When colorimetry is not performed, the sheet 50 is cut by the cutter 5. The cut sheet 50 is discharged from the discharge guide 14 onto the discharge basket (not illustrated).

FIG. 1C illustrates an example of a colorimetric sensor used in the first exemplary embodiment of the present invention. This colorimetric sensor 20 includes a ring-shaped light receiving system including a plurality of band-pass filters 107 for 400-nm to 700-nm wavelengths at 10-nm intervals with geometry from 0 to 45 degrees.

A light emitting element 101 is a tungsten lamp disposed to vertically emit light to an object under measurement. A total of 31 photoelectric conversion elements 102 is annularly arranged to extract 45-degree irregular reflection components of reflected light reflected by the object under measurement. The band-pass filters 107 having respective peaks of transmitted wavelengths from 400 nm to 700 nm at 10-nm intervals are disposed at anterior portions of respective photoelectric conversion elements 102. An irregular reflection component from the object under measurement is dispersed, and converted into a voltage by each of the photoelectric conversion elements 102 to measure the light-receiving intensity. Then, an analog-to-digital (A/D) converter 103 converts each voltage into 16-bit digital data. Although, in the present exemplary embodiment, the number of the A/D converters 103 equals the number of the photoelectric conversion elements 102 to increase the processing speed, it is also possible to provide an analog switch in the middle of the photoelectric conversion elements 102 and the A/D converters 103, and to successively perform switching of the analog switch to achieve analog-to-digital conversion. Further, these pieces of digital data at 10-nm intervals are normalized and output, assuming the total reflection as a 150% reflectance, and spectral reflectance data is output to outside the inkjet recording apparatus via an interface (I/F) unit.

For the purpose of reflectance normalization, the colorimetric sensor 20 is shipped together with the white reference plate 110 as a calibration member (a reference object under measurement). Before shipment, the spectral reflectance of the white reference plate 110 is measured by using a standard spectrum colorimeter to acquire a reference value. The result of the measurement is converted into 16-bit gradation data at intervals of 10-nm wavelength, and then stored in a storage unit 105 of a colorimetric sensor 20 to be shipped together.

In reflectance normalization, the colorimetric sensor 20 emits light to the white reference plate 110 and then receives light reflected on the surface thereof to measure the spectral reflectance of the white reference plate 110. The CPU 23 divides 16-bit digital data acquired at intervals of 10-nm band by the stored 16-bit reference spectral reflectance for the same wavelength, to calculate a correction factor, and, at the time of chart measurement, multiplies the result of each measurement by the correction factor as correction values.

Before shipment, reference values for sensor status determination are stored in the storage unit 105 in the colorimetric sensor 20. Specifically, by using the colorimetric sensor 20, the CPU 23 measures, at a specified position, the spectral reflectance of the white reference plate 110 to be shipped together with the colorimetric sensor 20. As illustrated in FIG. 3, values acquired through reflectance normalization, assuming the reference voltage of the A/D converter 103 as a 150% reflectance, are stored in the storage unit 105 of the colorimetric sensor 20 as reference values for the sensor status determination, together with the reference spectral reflectance.

In a case where the measurement environment, such as the temperature and humidity, changes, or after a certain time period has elapsed since the last reflectance correction, the user performs reflectance correction to calculate correction values, and normalizes the spectral reflectance output from the colorimetric sensor 20 based on an output value from each photoelectric conversion element 102 and the reference spectral reflectance stored in the colorimetric sensor 20.

The colorimetric sensor 20 according to the exemplary embodiment can selectively output two different results as measurement values: a result of reflectance normalization performed based on the reference spectral reflectance stored in the colorimetric sensor 20, and a result of reflectance normalization assuming the reference voltage of the A/D converter 103 as a 150% reflectance.

Figure 4:
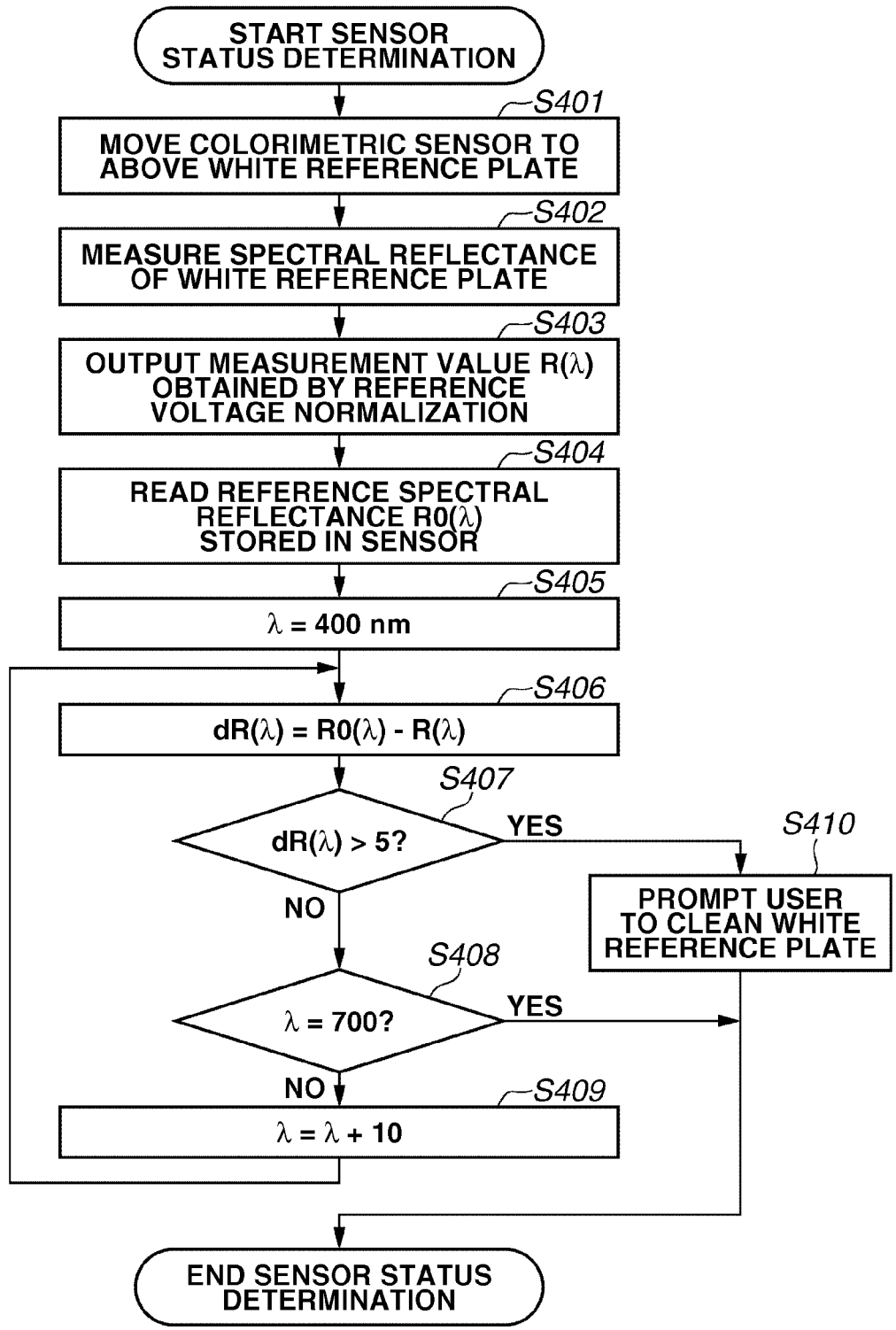
FIG. 4 is a flowchart illustrating sensor status determination by an inkjet recording apparatus according to a first exemplary embodiment of the present invention.

FIG. 4 is a flowchart illustrating sensor status determination processing using the above-described configuration of the colorimetric unit 6 and the colorimetric sensor 20. In the sensor status determination processing illustrated in FIG. 4, the CPU 23 compares non-normalized measurement values acquired before shipment with non-normalized measurement values acquired at the time of sensor status determination processing to determine the sensor status.

It is desirable that the sensor status determination processing illustrated in FIG. 4 is executed at fixed intervals based on the time period or the number of times the colorimetric sensor 20 is used. In the present exemplary embodiment, the CPU 23 performs this processing immediately before printing a print product which uses the colorimetric sensor 20. The sensor status may be checked immediately before the actual colorimetric processing after printing. In this case, however, when the sensor status is determined to be abnormal as a result of check, it is desirable to once store the print product and then perform colorimetry again after completion of a recovery operation (described below) by the user to prevent the print product from becoming useless. In this case, however, since the tint of the print product may change depending on the time period during which the printed chart is left, it is desirable to determine the sensor status before printing as described above.

It is desirable to perform the sensor status determination processing illustrated in FIG. 4 each time the user attaches the colorimetric sensor 20 to the inkjet recording apparatus 16.

The sensor status determination processing will be described in detail below with reference to FIG. 4. In step S401, the CPU 23 moves the colorimetric sensor 20 to above the white reference plate 110 to perform measurement of the white reference plate 110 to be measured in the state of factory default (before shipment). In step S402, after completion of sensor movement, the CPU 23 measures the spectral reflectance of the white reference plate 110. In step S403, after completion of colorimetry, the CPU 23 transmits, to the colorimetric apparatus control circuit 38, the spectral reflectance obtained through reflectance normalization assuming the reference voltage of the A/D converter 103 as a 150% reflectance. In step S404, upon acquisition of the spectral reflectance, the colorimetric apparatus control circuit 38 reads the measurement values before shipment stored in the colorimetric sensor 20.

From step S405 on, the CPU 23 sequentially makes a comparison of these values for each wavelength. In step S405, the CPU 23 sets 400 nm as an initial wavelength under comparison. In step S406, the CPU 23 calculates a difference between the current measurement value normalized with the read reference voltage and the reference spectral reflectance $R0(\lambda)$ stored in the colorimetric sensor 20. In step S407, the CPU 23 determines whether the difference is larger than 5. When the difference is determined to be equal to or smaller than 5 (NO in step S407), the CPU 23 repeats steps S408, S409, S406, and S407 until the wavelength under comparison reaches 700 nm. When the difference is determined to be larger than 5 for any wavelength (YES in step S407) before the wavelength under comparison reaches 700 nm, the processing proceeds to step S410.

Figure 5:
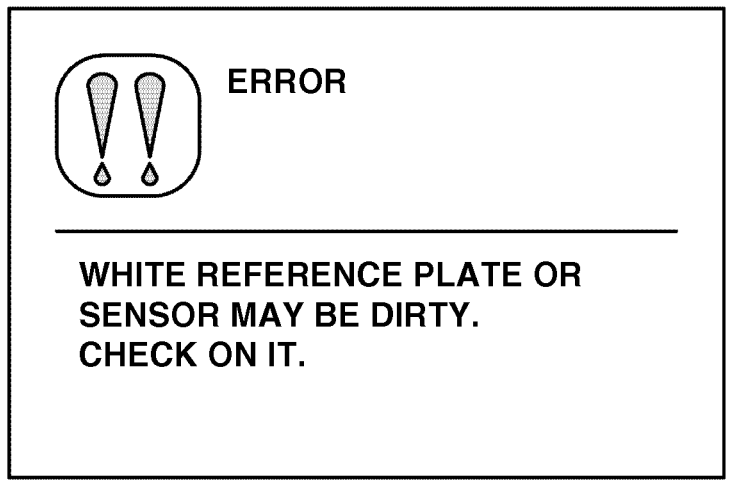
FIG. 5 schematically illustrates an example message displayed by the inkjet recording apparatus according to the first exemplary embodiment.

When the difference is determined to be larger than the threshold value, it is highly likely that the white reference plate 110 or the measurement unit of the colorimetric sensor 20 has degraded. For example, the surface of the white reference plate 110 may be soiled. In step S410, the CPU 23 displays a message, as illustrated in FIG. 5, to prompt the user to clean the colorimetric sensor 20 and the white reference plate 110.

The user confirms the message on the display unit and then takes recovery measures according to the displayed information. Specifically, the user once detaches the colorimetric sensor 20 and the white reference plate 110, cleans the surface thereof according to an operation guide, and then attaches them again. When the colorimetric sensor 20 and the white reference plate 110 have been attached, the CPU 23 performs the sensor status determination sequence again. When the difference is determined to be not larger than the threshold value, the CPU 23 performs printing and colorimetric operations. When the difference is determined to be larger than the threshold again (YES in step S407), the CPU 23 displays a similar message to the previous one on the display unit. If an error repetitively occurs, the user performs sensor recalibration procedures according to the guidance of the operation guide.

Although, in the present exemplary embodiment, the CPU 23 displays one type of message in step S410, the information to be displayed may be changed depending on how the difference exceeds the threshold value. Specifically, if only measurement values corresponding to a filter for a specific wavelength are remarkably larger than the threshold value, dirt adhesion to a relevant filter of a light receiving element 102 or degradation of a specific photoelectric conversion element 102 is assumed. If measurement values corresponding to a plurality of contiguous filters exceed the threshold value, or if wavelengths around the wavelength exceeding the threshold value are close to the threshold value, it is assumed that dirt adheres to the colorimetric sensor 20 or the white reference plate 110. A large majority of dirt is due to ink and oil which seldom provide a steep spectral reflectance or a steep peak of spectral transmittance. Therefore, if only measurement values corresponding to the filter for the specific wavelength are remarkably larger than the threshold value, it can be determined that the filter corresponding to the relevant wavelength or the relevant photoelectric conversion element itself is highly likely to have degraded. Further, when measurement values are larger than the threshold value or is close to the threshold value for all wavelengths, degradation of a light source can be assumed.

Although, in the present exemplary embodiment, measurement values are compared with the threshold value for all wavelengths, the processing is not limited thereto. Inspection may be omitted for some bands to increase the processing speed, and, when inspection is to be made focusing only on user mis-operations and dirt adhesion, the comparison may be performed only for specific wavelengths. In these cases, among the 400-nm to 700-nm wavelength bands, the 400- and 700-nm wavelength bands does not affect chromaticity variation much and, therefore, more worth being omitted than other wavelength bands. Alternatively, only when measurement values are larger than the threshold value for a certain wavelength after inspection is performed only on specific bands, other wavelength bands may be inspected. If adjustment of the light emission intensity from the light emitting element or the light receiving intensity (sensitivity) is possible, this adjustment is also applicable.

When comparison is completed for all of the wavelengths subjected to measurement, and the sensor status is determined to be normal, the CPU 23 determines that the colorimetric sensor 20 is normal and then starts chart printing and colorimetric operations.

As described above, according to the first exemplary embodiment of the present invention, during colorimetry for the white reference plate 110, applying the reflectance correction amount stored in the colorimetric sensor 20, outputting the values based on the spectral reflectance, and determining the output values enable determination of the amount of shift from the values at the time of sensor calibration including dirt adhering to the colorimetric sensor 20 and the white reference plate 110 due to user mis-operations.

A second exemplary embodiment of the present invention will be described below.

Similar to the first exemplary embodiment, as illustrated in FIG. 1C, a colorimetric sensor 20 according to the second exemplary embodiment includes a ring-shaped light receiving system including a plurality of band-pass filters 107 for 400-nm to 700-nm wavelengths at 10-nm intervals with geometry from 0 to 45 degrees.

In the present exemplary embodiment, the colorimetric sensor 20 includes a chromaticity calculation circuit and a data storage area for chromaticity calculation. The colorimetric sensor 20 is provided with a function of outputting measured spectral reflectance, and chromaticity values (L*, a*, b*, X, Y, Z, etc.) using the specific light source and standard viewing angle based on the luminous efficiency characteristics and standard light source data stored in the data storage area.

Further, as reference values for the sensor status determination, measured spectral reflectance of the reflectance correction version and reflectance correction values are stored in the storage unit 105 in the colorimetric sensor 20 before shipment. The reflectance correction values in this case have undergone reflectance correction after sensor calibration.

At the time of the sensor status determination, the CPU 23 measures the reflectance correction version by applying the stored reflectance correction values, and outputs the difference between the acquired colorimetric values and the spectral reflectance values before shipment. In this case, the chromaticity value difference can be output together with the spectral reflectance difference value.

In addition, the colorimetric sensor 20 includes a memory area for storing the difference to enable storing measured differential chromaticity values when storage is specified at the time of sensor status determination. The storage unit 105 includes a flag indicating whether differential chromaticity values are stored therein. This flag is set to 1 when differential chromaticity values are stored therein.

Figure 7:
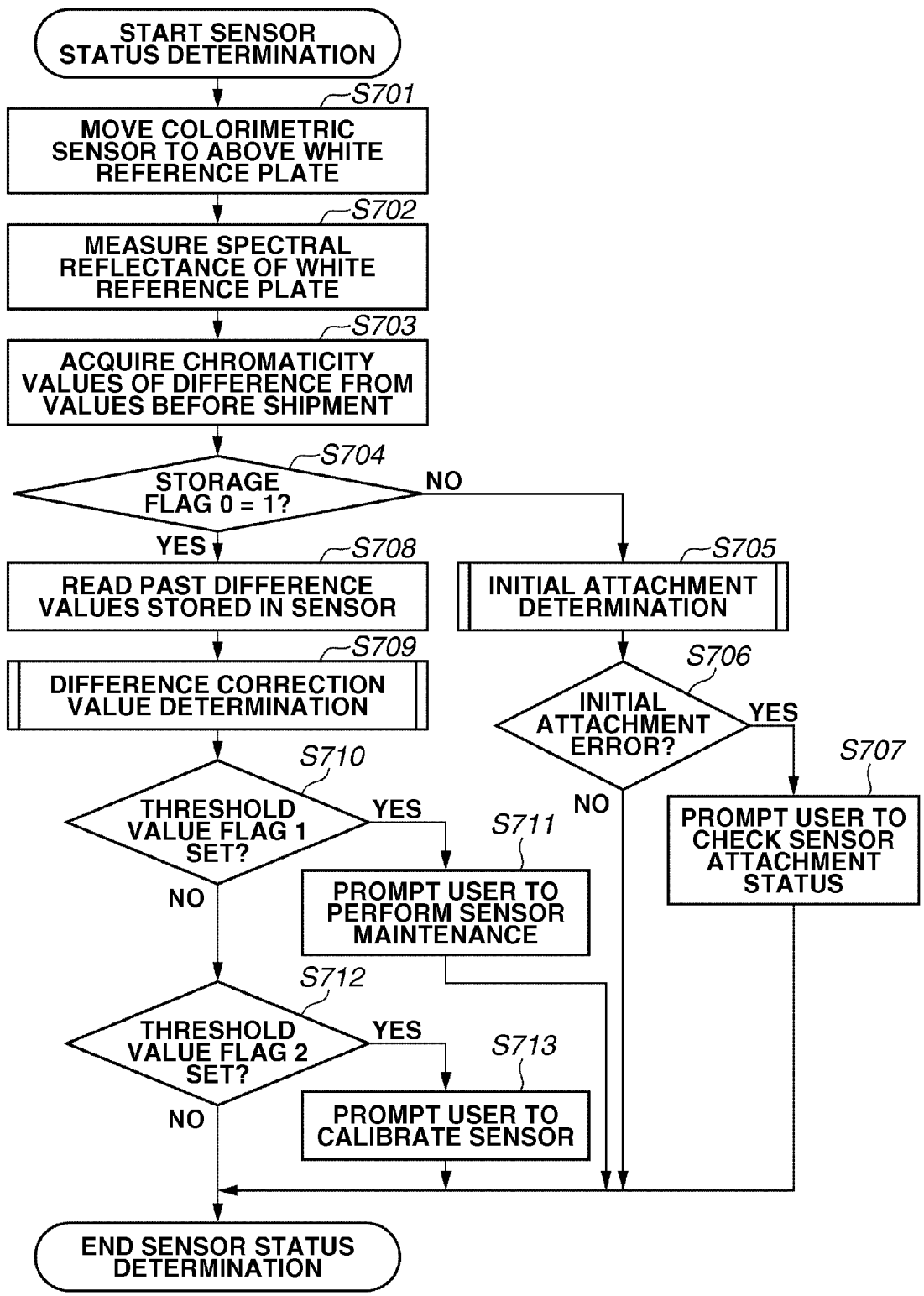
FIG. 7 is a flowchart illustrating sensor status determination by the inkjet recording apparatus according to the second exemplary embodiment.

FIG. 7 is a flowchart illustrating sensor status determination processing performed by a connected sensor control apparatus by using the above-described colorimetric sensor 20.

Similar to the first exemplary embodiment, it is desirable that the sensor status determination processing illustrated in FIG. 7 is executed a plurality of number of times at fixed intervals based on the time period or the number of times the colorimetric sensor 20 is used. In the present exemplary embodiment, the processing is executed immediately before printing a print product using the colorimetric sensor 20.

In step 701, when the sensor status determination processing is started, the colorimetric apparatus control circuit 38 moves the colorimetric sensor 20 to above the white reference plate 110. In step S702, after completion of sensor movement, the CPU 23 measures the reflectance of the reflectance correction version by applying the reflectance correction values stored in the colorimetric sensor 20 before shipment. After measurement, the colorimetric sensor 20 calculates chromaticity values based on the reflectance, and also calculates chromaticity values of difference from the stored spectral reflectance values before shipment. After completion of calculation, the processing exits the sensor measurement. In step S703, after completion of measurement, the colorimetric apparatus control circuit 38 acquires, from the colorimetric sensor 20, chromaticity values of difference (dL, da, and db) from the values before shipment, and the processing proceeds to step S704.

Figure 8:
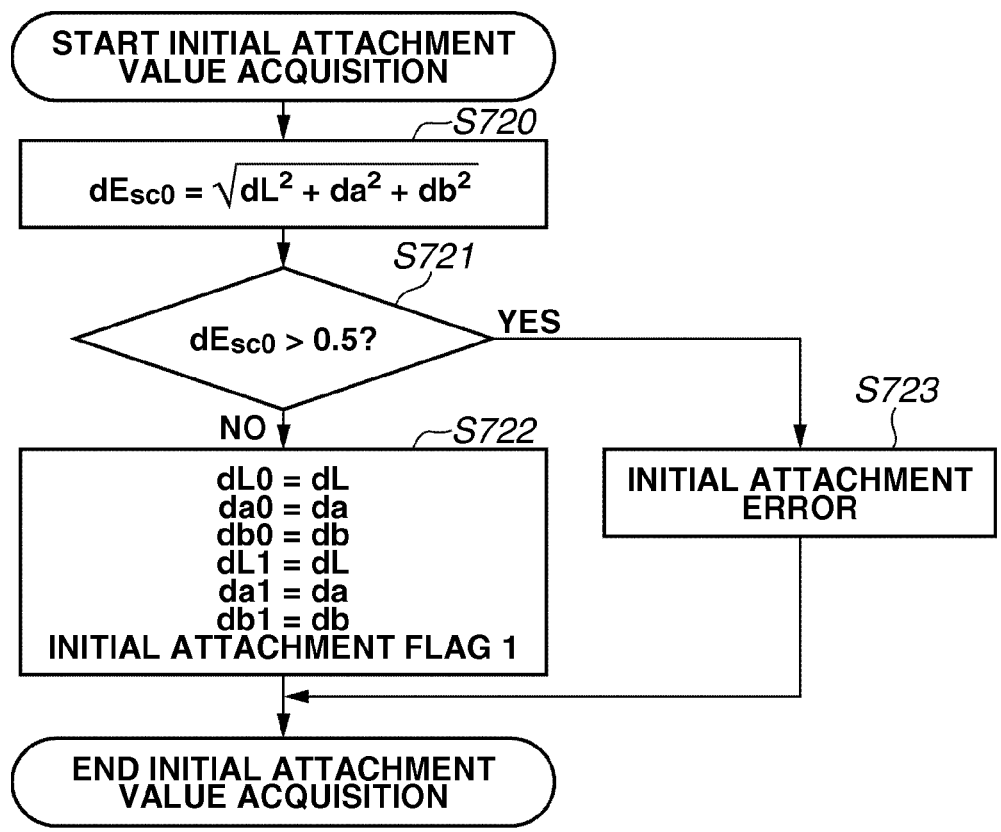
FIG. 8 is part of the flowchart illustrating sensor status determination by the inkjet recording apparatus according to the second exemplary embodiment.

In step S704, the CPU 23 determines whether differences measured in the past are stored. The CPU 23 performs relevant determination by checking a difference storage flag in the colorimetric sensor 20. When the difference storage flag is set to 1 (YES in step S704), the CPU 23 determines that, in the past, the colorimetric sensor 20 was connected to the colorimetric apparatus control circuit 38, sensor status determination was performed, and then the difference at that time was recorded. When past data is not present (NO in step S704), the CPU 23 determines that the colorimetric sensor 20 is connected to the colorimetric apparatus control circuit 38 for the first time, then in step S705, the CPU 23 generates values at the time of initial attachment, and stores the values in the colorimetric sensor 20. FIG. 8 is another flowchart illustrating sensor status determination in detail.

In the present exemplary embodiment, the CPU 23 performs different sensor status determination sequences at the time of initial attachment and at other times. This aims at detecting an incorrect attachment, such as dirt adhesion to the white reference plate 110 or the colorimetric sensor 20, and failure to attach the white reference plate 110, because the colorimetric sensor 20 is attached by the user at the time of initial attachment without exception.

In step S720, by using the values dL, da, and db output from the colorimetric sensor 20, the CPU 23 calculates a difference between correction amounts of the colorimetric sensor 20 and the white reference plate 110 as an variation amount equivalent to the color difference. In step S721, the CPU 23 determines whether the difference is larger than the threshold value.

When the difference is determined to be larger than the threshold value (YES in step S721), the CPU 23 determines that the sensor status is very highly likely to have varied from the status before shipment because of, for example, incorrect attachment by the user, and sets an error flag.

When the difference is determined to be equal to or smaller than the threshold value (NO in step S721), the CPU 23 stores the acquired values dL, ad, and db in difference memories 0 and 1, and sets the difference storage flag to 1. Then, the processing exits the subsequence. Although, in the present exemplary embodiment, the values dL, da, and db are stored, the processing is not limited thereto. The difference spectral reflectance itself, or the values X, Y, and Z may be stored. As in the present exemplary embodiment, storing the chromaticity values, not the difference spectral reflectance, enables reducing the amount of data in the difference memories 0 and 1 in comparison with a case where the difference spectral reflectance is directly stored.

When the difference storage flag 0 is set to 1 (YES in step S704 in FIG. 7), i.e., initial attachment determination has been made, then in step S708, the CPU 23 reads values from the difference memories 0 and 1 stored in the colorimetric sensor 20, and the processing proceeds to step S709. In step S709, the CPU 23 performs sensor status determination by using the measured values and the read values.

Figure 9:
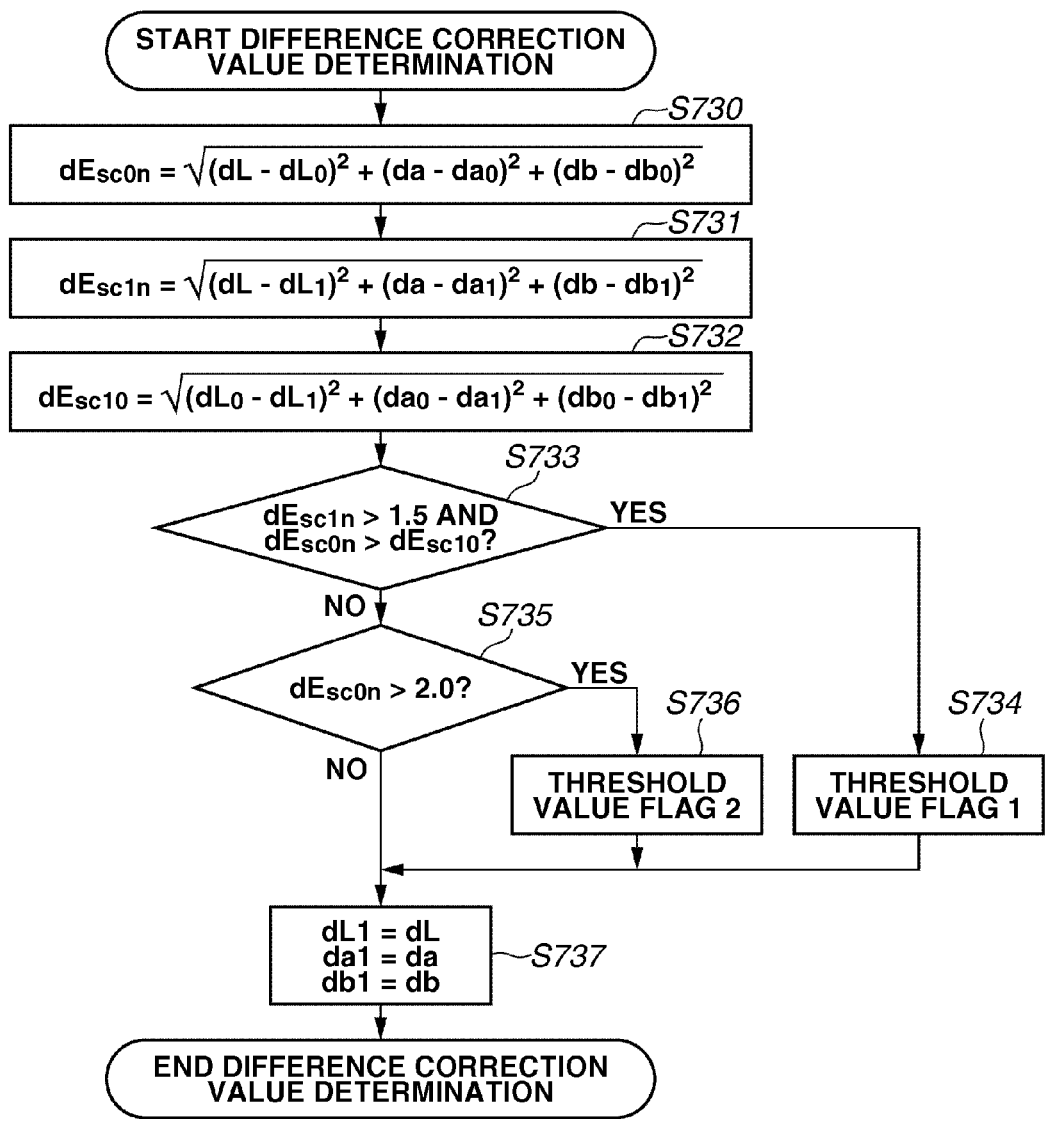
FIG. 9 is part of the flowchart illustrating sensor status determination by the inkjet recording apparatus according to the second exemplary embodiment.

FIG. 9 is a flowchart illustrating difference correction value determination at the time other than when initial attachment is performed. In difference correction value determination, the CPU 23 calculates values equivalent to the color difference of correction amounts by using dL, da, and db measured at the time of determination, dL0, da0, and db0 stored in the difference memory 0 at the time of initial attachment, and dL1, da1, and db1 stored at the time of last determination. When performing determination for the first time after initial attachment, the values dL1, da1, and db1 are the same as the values dL0, da0, and db0, respectively.

In step S730, the CPU 23 calculates a value dESc0n equivalent to the color difference of the correction amount at the time of initial attachment and at the time of current determination. In step S731, the CPU 23 calculates a value dESc1n equivalent to the color difference of the correction amount at the time of last determination and at the time of current determination. In step S732, the CPU calculates a value dESc10 equivalent to the color difference of the correction amount at the time of initial attachment and at the time of last determination.

In step S733, after completion of calculations, the CPU 23 determines a first threshold value 1.5. In step S733, the CPU 23 makes comparisons of all the three different values equivalent to the color difference. Specifically, the CPU 23 determines whether the value dESc1n equivalent to the color difference of the correction amount at the time of last determination and at the time of current determination is larger than the first threshold value 1.5, and whether the value dESc0n equivalent to the color difference of the correction amount at the time of initial attachment and at the time of current determination is larger than the value dESc10 equivalent to the color difference of the correction amount at the time of initial attachment and at the time of last determination. When both of these conditions are met (YES in step S733), i.e., when the value dESc1n is determined to be larger than the first threshold value 1.5, and the value dESc0n is determined to be larger than the value dESc10, the processing proceeds to step S734.

In the determination in step S733, the CPU 23 determines whether variation in the correction amounts from the values at the time of last determination is larger than the threshold value. When variation is determined to be larger than the threshold value, the CPU 23 further makes a comparison about whether the acquired values vary to get away from the values at the time of initial attachment. In this case, the CPU 23 determines whether dirt adheres to the colorimetric sensor 20 or the white reference plate 110. When the amount of variation from the values at the time of last determination is large, the CPU 23 determines that dirt adheres thereto during user operations, cleaning, or other handling.

Further, the CPU 23 determines whether the acquired values vary to get closer to or away from the values at the time of initial attachment. If the user wipes off dirt during the time since the time of last determination till the time of current determination, the values equivalent to the color difference vary to get closer to the values at the time of initial attachment. In this case (NO in step S733), the CPU 23 does not determine the adherence of dirt.

When the values equivalent to the color difference vary to get away from the values at the time of initial attachment, the CPU 23 determines that status of the colorimetric sensor 20 or the white reference plate 110 has varied because of dirt during the time since the time of last determination till the time of current determination (YES in step S733), then in step S734, the CPU 23 sets the threshold value flag 1.

When the above-described conditions are determined to be not met (NO in step S733), i.e., when the value dESc1n is determined to be equal to or smaller than the first threshold value 1.5, and the value dESc0n is determined to be equal to or smaller than the value dESc10, then in step S735, the CPU 23 performs second determination. In step S735, the CPU 23 determines whether the value dESc0n equivalent to the color difference of the correction amount at the time of initial attachment and at the time of current determination is equal to or larger than a second threshold value 2.0. When the value dESc0n is determined to be equal to or larger than the second threshold value 2.0 (YES in step S735), the CPU 23 determines that variation in the correction amount from the values at the time of initial attachment is gradually increasing, and that variation is caused mainly by the reduction in the light quantity of the light source or the degradation of an optical filter, and the processing proceeds to step S736.

Generally, with a light source, such as tungsten, halogen, and light emitting diode (LED), the correction values gradually change as the lighting time progresses over a very long time period in comparison with a case of dirt due to user operations. Similarly, with aging of the optical filter and the white reference plate 110, the correction values change over a very long time period in comparison with a case of dirt and dust due to user operations. In step S736, therefore, the CPU 23 determines that a device, such as the light source, the filter, and the white reference plate 110, has varied, and that sensor calibration is required.

If the reduction in the light quantity of the light source or the degradation of the optical filter occurs, the calibration performed before shipment needs to be performed again. In step S736, therefore, the CPU 23 sets a threshold value flag 2 which is different from the threshold value flag 1 set in step S734. After completion of the determination, then in step S737, the CPU 23 stores the values dL, da, and db acquired in the current measurement in the difference memory 1 in the colorimetric sensor 20, and sets the storage flag to 1.

After completion of the initial attachment determination in step S705 and the difference correction value determination in step S709, the CPU 23 reflects the result of the determination processing, and display the result on the display unit as required.

When the sensor status is determined to be normal in steps S705 and S709, the CPU 203 determines that the colorimetric sensor 20 is normal and starts chart printing and colorimetric operations.

Figure 10A:
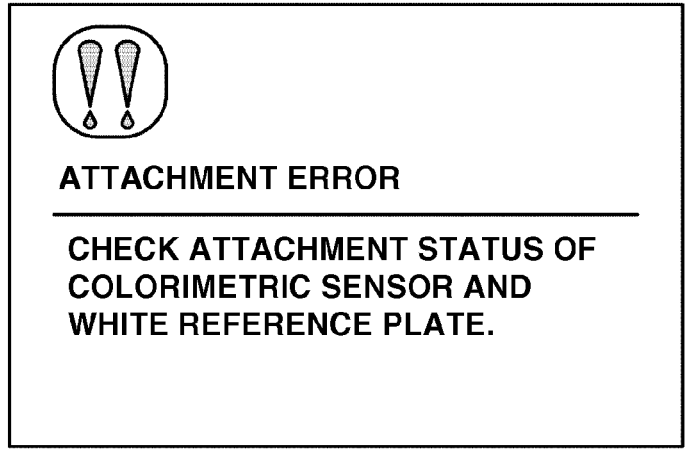
FIGS. 10A, 10B, and 10C schematically illustrate example messages displayed by the inkjet recording apparatus according to the second exemplary embodiment of the present invention.
Figure 10B:
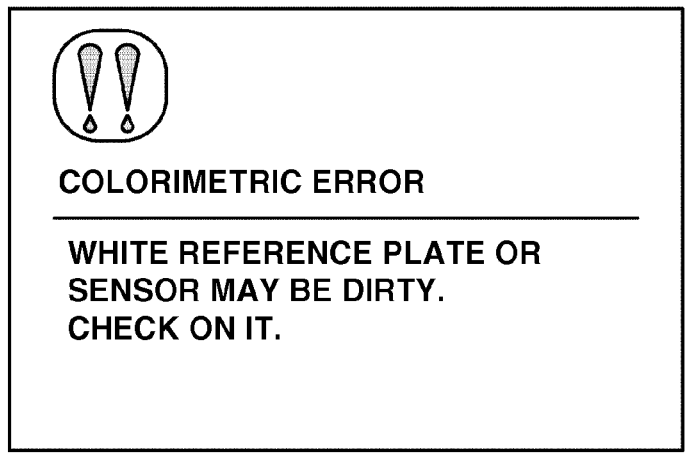
Figure 10C:
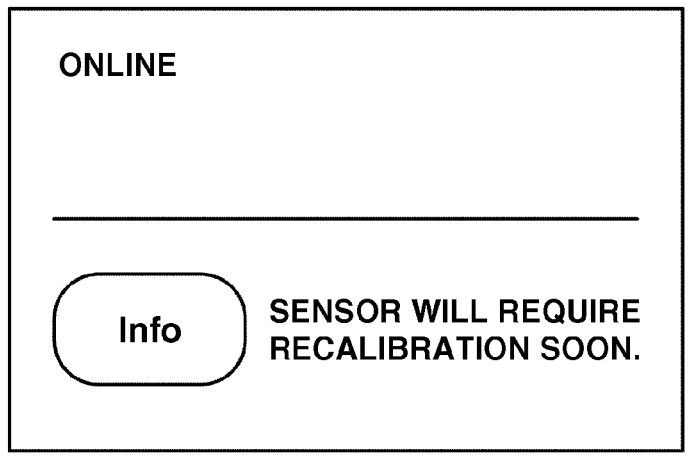

When an initial attachment error is determined in the initial attachment determination in step S705, then in step S706, the CPU 23 determines an initial attachment error (YES in step S706), and the processing proceeds to step S707. In step S707, as illustrated in FIG. 10A, the CPU 23 displays, on the display unit, a message to prompt the user to check the sensor attachment. When an initial attachment error does not occur (NO in step S706), the processing exits the sensor status determination sequence. Similarly, when variation is determined to be larger than the threshold value in step S709, then in steps S710 and S712, the CPU 23 determines the information to be displayed on the display unit depending on the statuses of the threshold value flags 1 and 2. In step S710, the CPU 23 determines whether the threshold value flag 1 is set. When the flag 1 is set, then in step S711, the CPU 23 displays a message to prompt the user to perform sensor maintenance, as illustrated in FIG. 10B. In step S712, the CPU 23 determines whether the threshold value flag 2 is set. When the flag 2 is set, then in step S713, the CPU 23 displays a message to prompt the user to calibrate the colorimetric sensor 20, as illustrated in FIG. 10C.

In the present exemplary embodiment, in step S710, it is very highly likely that the colorimetric sensor 20 has degraded because of dirt or user mis-operations. In this case, the CPU 23 determines an error and immediately prompts the user to clean the colorimetric sensor 20 and the white reference plate 110. In response to the message, the user confirms cleaning procedures with reference to the operation guide, such as a manual, cleans the colorimetric sensor 20 and the white reference plate 110, and then performs colorimetry again. Before performing colorimetry, the CPU 23 checks the sensor status again by the sensor status determination processing. When the difference is determined to be equal to or smaller than the threshold value as a result of cleaning by the user, the CPU 23 performs the colorimetric operation without displaying an error message.

In step S712, the colorimetric sensor 20 is determined to have degraded. However, if the sensor degradation is within a certain degree, reflectance correction may possibly enable preventing measurement values from being affected by the degradation. Therefore, in step S713, a guidance message for prompting the user to perform recalibration is displayed, enabling the user to perform colorimetry. However, the processing is not limited thereto. An error message may be displayed, similar to step S710.

It is desirable that the sensor status determination illustrated in FIG. 7 is periodically and automatically performed by the colorimetric apparatus control circuit 38. Specifically, the sensor status determination may be executed at predetermined time intervals by using a timer or based on the value of a counter for counting the number of reflectance calibrations.

The above-described technique according to the present exemplary embodiment enables determination of the sensor status through the comparison of the reflectance correction values of the colorimetric sensor 20. Further, measuring the amounts of variation from the values at the time of last determination in addition to the amounts of variation from the values at the time of initial attachment, i.e., performing measurement a plurality number of times, enables presumption of the cause of variation in correction amounts, based on information about a plurality of measurements, and this can prompt the user to take suitable measures.

It is also possible to develop a program for causing a computer to execute the above-described detection method, and to implement the detection method according to the present invention by executing the program.

According to an exemplary embodiment of the present invention, it is possible to provide a recording apparatus capable of easily detecting dirt on components that corrects the optical characteristics of a sensor for reading a recording material.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-102474 filed Apr. 27, 2012, which is hereby incorporated by reference herein in its entirety.

What is claimed is:

1. A recording apparatus comprising:
a sensor including a light emitting element for emitting light to a recording medium, and a light receiving element for receiving the light emitted from the light emitting element and reflected by the recording medium, configured to, via the light emitting element and the light receiving element, measure a patch recorded on the recording medium by a recording head for performing recording on the recording medium based on image data;
a calibration member configured to reflect light emitted from the light emitting element, and to be used to calibrate the sensor based on a result of optical measurement of the calibration member performed by receiving, via the light receiving element, reflected light reflected by the calibration member; and
a detection unit configured to detect dirtiness of the calibration member based on the result of the optical measurement of the calibration member by using the sensor and a result of optical measurement of the calibration member performed before the measurement.

2. The recording apparatus according to claim 1, further comprising:
a storage unit configured to store the result of the optical measurement of the calibration member,
wherein the detection unit detects the dirtiness of the calibration member based on the result of the optical measurement of the calibration member by using the sensor and a result of previously-performed optical measurement of the calibration member stored in the storage unit.

3. The recording apparatus according to claim 2, wherein, when a difference between the result of the optical measurement of the calibration member by using the sensor and the result of the optical measurement of the calibration member last performed by using the sensor is within a predetermined value, and when the result of the optical measurement of the calibration member last performed by using the sensor varies to get closer to the result of the optical measurement of the calibration member by using the sensor stored in the storage unit as an initial value, the detection unit determines the calibration member not to be dirty.

4. The recording apparatus according to claim 1, wherein the detection unit detects the dirtiness of the calibration member based on the result of the optical measurement of the calibration member by using the sensor and a result of optical measurement of the calibration member last performed by using the sensor.

5. The recording apparatus according to claim 4, wherein, when a difference between the result of the optical measurement of the calibration member by using the sensor and the result of the optical measurement of the calibration member last performed by using the sensor is larger than a predetermined value, the detection unit determines the calibration member to be dirty.

6. The recording apparatus according to claim 1, wherein the optical measurement of the calibration member by using the sensor is performed a plurality of number of times at predetermined intervals to detect a status of a surface of the calibration member based on results of the plurality of number of measurements.

7. The recording apparatus according to claim 1, further comprising:
an attachment unit configured to attach the detachable calibration member to the recording apparatus.

8. The recording apparatus according to claim 1, wherein the calibration member is plate-shaped.

9. The recording apparatus according to claim 1, further comprising:
a display unit configured to display information about the dirtiness of the calibration member detected by the detection unit,
wherein information about a detected status of a surface of the calibration member is displayed on the display unit.

10. The recording apparatus according to the claim 1, wherein the recording head is provided with a discharge port for discharging ink to serve as an ink discharge head for discharging ink from the discharge port onto the recording medium.

11. A method for detecting dirtiness of a calibration member for calibrating a sensor including a light emitting element for emitting light to a recording medium, and a light receiving element for receiving the light emitted from the light emitting element and reflected by the recording medium, configured to, via the light emitting element and the light receiving element, measure a patch recorded on the recording medium by a recording head for performing recording on the recording medium based on image data, the method comprising:

optically measuring the calibration member by receiving, via the light receiving element, reflected light of light emitted from the light emitting element; and detecting the dirtiness of the calibration member based on a result of the optical measurement of the calibration member and a result of optical measurement of the calibration member performed before the measurement.

12. The method according to claim 11, further comprising:
storing the result of the optical measurement of the calibration member in a storage unit; and
detecting the dirtiness of the calibration member based on the result of the optical measurement of the calibration member by using the sensor and a result of previously-performed optical measurement of the calibration member stored in the storage unit.

13. The method according to claim 11, further comprising:
detecting the dirtiness of the calibration member based on the result of the optical measurement of the calibration member by using the sensor and a result of optical measurement of the calibration member last performed by using the sensor.

14. The method according to claim 13, further comprising:
determining the calibration member to be dirty when a difference between the result of the optical measurement of the calibration member by using the sensor and the result of the optical measurement of the calibration member last performed by using the sensor is larger than a predetermined value.

15. The method according to claim 11, further comprising:
determining the calibration member not to be dirty when a difference between the result of the optical measurement of the calibration member by using the sensor and a result of optical measurement of the calibration member last performed by using the sensor is equal to or smaller than a predetermined value, and when the result of the optical measurement of the calibration member last performed by using the sensor varies to get closer to a result of optical measurement of the calibration member by using the sensor performed at the time of initial attachment.

16. The method according to claim 11, further comprising:
performing the optical measurement of the calibration member by using the sensor a plurality of number of times at predetermined intervals to detect a status of a surface of the calibration member based on results of the plurality of number of measurements.

17. The method according to claim 11, wherein the calibration member is plate-shaped.

18. The method according to claim 11, further comprising:
displaying information about a detected status of a surface of the calibration member on a display unit for displaying the information about the detected dirtiness of the calibration member.

19. The method according to claim 11, wherein the recording head is provided with a discharge port for discharging ink to serve as an ink discharge head for discharging ink from the discharge port onto the recording medium.

20. A computer-readable storage medium storing a program that causes a computer to execute the method according to claim 11.

* * * * *